US012771087B2

(12) United States Patent
Maier et al.

(10) Patent No.: US 12,771,087 B2
(45) Date of Patent: Oct. 20, 2026

(54) PROVIDING ULTRAFAST HIGH-ENERGY LASER PULSES

(71) Applicant: Deutsches Elektronen-Synchrotron DESY, Hamburg (DE)

(72) Inventors: Andreas Maier, Hamburg (DE); Lutz Winkelmann, Hamburg (DE)

(73) Assignee: Deutsches Elektronen-Synchrotron DESY, Hamburg (DE)

( * ) Notice: Subject to any disclaimer, the term of this patent is extended or adjusted under 35 U.S.C. 154(b) by 753 days.

(21) Appl. No.: 18/034,671

(22) PCT Filed: Nov. 1, 2021

(86) PCT No.: PCT/EP2021/080255
§ 371 (c)(1),
(2) Date: Apr. 28, 2023

(87) PCT Pub. No.: WO2022/096413
PCT Pub. Date: May 12, 2022

(65) Prior Publication Data

US 2023/0402805 A1 Dec. 14, 2023

(30) Foreign Application Priority Data

Nov. 3, 2020 (EP) .................................... 20205411

(51) Int. Cl.
*H01S 3/00* (2006.01)
*H05H 15/00* (2006.01)

(52) U.S. Cl.
CPC ............ *H01S 3/0057* (2013.01); *H01S 3/005* (2013.01); *H05H 15/00* (2013.01); *H01S 3/0085* (2013.01); *H01S 3/0092* (2013.01)

(58) Field of Classification Search
CPC ........ H01S 5/0057; H01S 5/005; H05H 15/00
See application file for complete search history.

(56) References Cited

U.S. PATENT DOCUMENTS

| | | |
|---|---|---|
| 4,961,195 A | 10/1990 | Skupsky et al. |
| 2017/0125964 A1 | 5/2017 | Russbueldt et al. |

(Continued)

FOREIGN PATENT DOCUMENTS

| | | | |
|---|---|---|---|
| EP | 3143669 B1 | 11/2019 | |
| WO | WO-2015139636 A1 * | 9/2015 | ............ H05H 15/00 |

(Continued)

OTHER PUBLICATIONS

Benedetti et al. (2014). Plasma wakefields driven by an incoherent combination of laser pulses: A path towards high-average power laser-plasma accelerators. Physics of Plasmas, 21, 056706.

(Continued)

*Primary Examiner* — James A Menefee
(74) *Attorney, Agent, or Firm* — Caesar Rivise, PC

(57) ABSTRACT

A method for providing an ensemble of beamlets effectively acting as a high-energy laser pulse is disclosed. According to the method, a beamlet pattern with a plurality of spatially distributed laser beamlets is provided. The beamlets are spread in time by introducing a different temporal delay to each of the beamlets. The beamlets are spectrally broadened. The beamlets are incoherently combined in space and time to provide the ensemble of beamlets. Also disclosed is a method for accelerating charged particles. Further disclosed is an optical arrangement for providing an ensemble of beamlets effectively acting as a high-energy laser pulse. The optical arrangement comprises a beamlet generating device providing a beamlet pattern of spatially distributed laser beamlets, a step optic for spreading the spatially distributed laser beamlets in time, a spectral broadening device, and a combining device for incoherently combining the spectrally broadened beamlets in space and time to provide the ensemble of beamlets. Additionally disclosed is a laser-plasma accelerator comprising the optical arrangement.

27 Claims, 3 Drawing Sheets

(56) References Cited

U.S. PATENT DOCUMENTS

Figure 1:
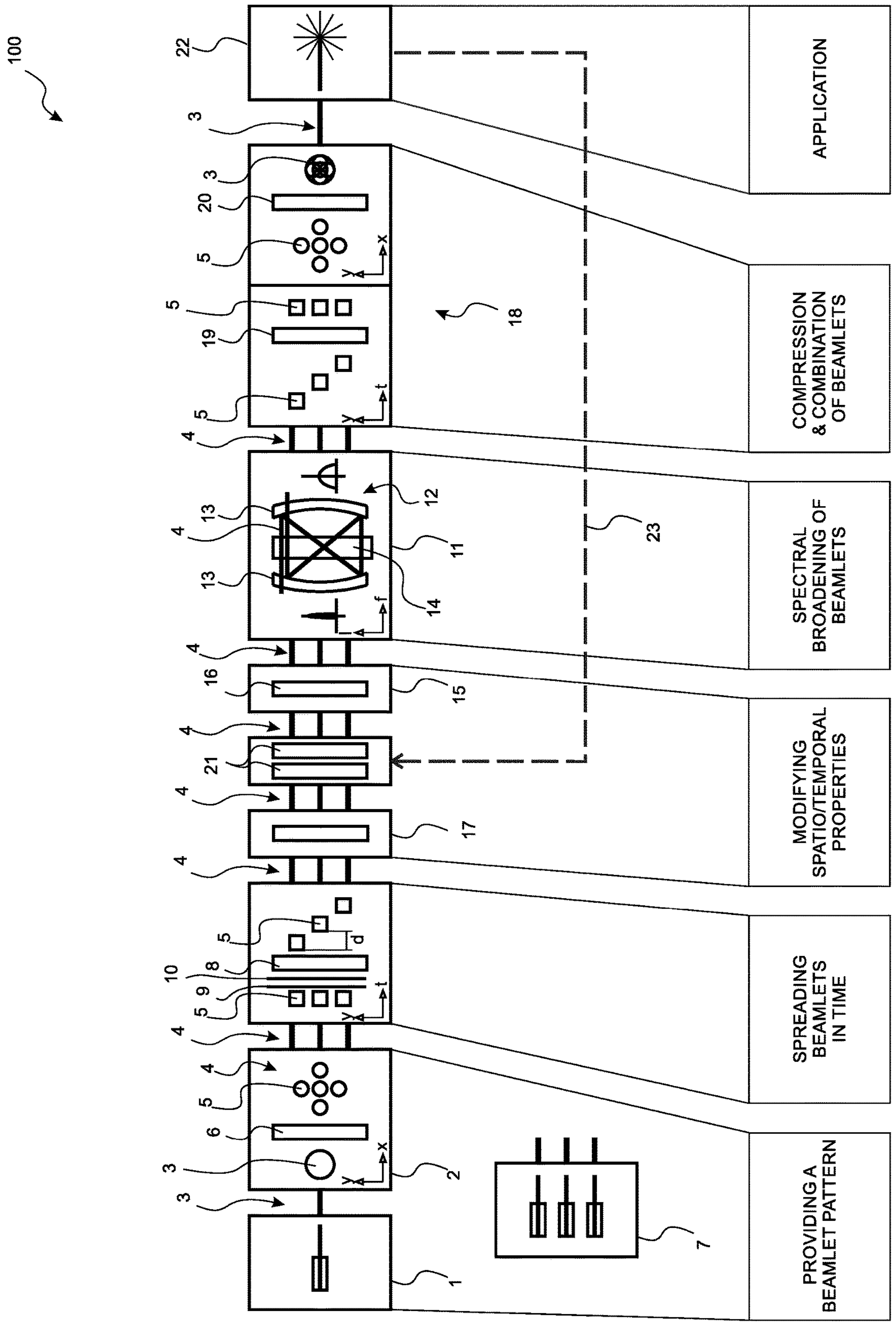

| | | | | |
|---|---|---|---|---|
| 2017/0179666 | A1 | 6/2017 | Klenke et al. | |
| 2017/0263410 | A1* | 9/2017 | Fallahi | H05H 15/00 |
| 2019/0013637 | A1 | 1/2019 | Mueller et al. | |
| 2021/0333565 | A1 | 10/2021 | Limpert et al. | |

FOREIGN PATENT DOCUMENTS

| | | | | | |
|---|---|---|---|---|---|
| WO | WO-2016166549 | A1 * | 10/2016 | | H05H 15/00 |
| WO | 2020074581 | A1 | 4/2020 | | |

OTHER PUBLICATIONS

Benedetti et al. (2016). Plasma wakefield excitation by incoherent laser pulses: A path towards high-average power laser-plasma accelerators. AIP Conference Proceedings 1777, 040001.

Hanna et al. (2017). Nonlinear temporal compression in multipass cells: theory. Journal of the Optical Society of America B, 34(7), 1340-1347.

Herriott et al. (1964). Off-axis paths in spherical mirror interferometers. Applied Optics, 3(4), 523-526.

Kaumanns et al. (2018). Multipass spectral broadening of 18 mJ pulses compressible from 1.3 ps to 41 fs. Optics Letters, 43(23), 5877-5880.

Klenke et al. (2014). Coherent combination of spectrally broadened femtosecond pulses for nonlinear compression. Optics Letters, 39(12), 3520-3522.

Klenke et al. (2019). Coherent beam combination of pulses emitted by a 16-core ytterbium-doped fiber. Proceedings of SPIE, 10897, 108971A.

Lavenu et al. (2018). Nonlinear pulse compression based on a gas-filled multipass cell. Optics Letters, 43(10), 2252-2255.

Siiman et al. (2012). Coherent femtosecond pulse combining of multiple parallel chirped pulse fiber amplifiers. Optics Express, 20(16), 18097-18116.

International Search Report for PCT/EP2021/080255 dated Feb. 7, 2022.

Extended European Search Report for EP 20205411.0 dated May 10, 2021.

* cited by examiner

PROVIDING ULTRAFAST HIGH-ENERGY LASER PULSES

CROSS-REFERENCE TO RELATED APPLICATIONS

This application is a U.S. National Phase Application of PCT/EP2021/080255, filed Nov. 1, 2021, which claims priority to EP 20205411.0, filed Nov. 3, 2020, the contents of which applications are incorporated herein by reference in their entireties for all purposes.

TECHNICAL FIELD

The present invention relates to a method and an optical arrangement for providing ultrafast high-energy laser pulses.

BACKGROUND

Applications increasingly demand ultrafast laser pulses at high peak and average power. Typical parameters range from terawatt-level (and beyond) peak powers and kilowatt-level (and beyond) average power, e.g. joule-level pulse energies in few (tens of) femtoseconds pulse length and kilohertz-level repetition rates. Traditional techniques to provide such laser pulses are limited in their ability to provide all of the required parameters by the same pulse.

For example, Ti:Sapphire-based laser systems have successfully demonstrated few tens of femtoseconds pulse lengths at joule-level energies, resulting in terawatt peak power, but are limited in scalability to high average power. This limit is a direct consequence of the laser crystal properties. Ti:Sapphire intrinsically supports the required broad bandwidth to directly generate few-femtosecond pulses. This feature, however, necessarily results also in a large quantum defect and a very short lifetime of the excited state. The consequence is, that the pump-to-signal conversion is low, and a significant fraction of the absorbed pump energy is converted into heat, which makes the cooling of the laser material very challenging. The short lifetime prevents effective direct pumping of the laser gain material using laser diodes available today. Therefore, a Ti:Sapphire laser is typically pumped by another solid-state laser, which results in a very low, often only sub-percent level, wall-plug efficiency. Together, these constraints limit typical Ti:Sapphire lasers to average powers of few tens of watts.

In contrast to Ti:Sapphire lasers, many other rare-earth doped laser materials, e.g. Yb-doped solid-state lasers, feature a much smaller quantum defect. In addition to the improved thermal management, the resulting milliseconds-lifetime allows them to be directly pumped by laser diodes and thus enables a high wall-plug efficiency of several ten percent. For this reason, Yb is the material of choice in many industrial laser systems, supporting kilowatt-level average powers, based on a wide range of architectures, including slabs, thin disks and fibres. However, the properties of such a laser medium necessarily support only a narrow bandwidth, compared to Ti:Sapphire. Consequently, pulse lengths are typically on a few-picoseconds to sub-picoseconds level, which may be enough to drive e.g. material processing applications, but is far from the desired terawatt peak power required e.g. by laser-plasma accelerators.

WO 2020/074581 A1 and ARNO KLENKE et al: "Coherent beam combination of pulses emitted by a 16-core ytterbium-doped fiber", Optics Letters, vol. 39, no. 12, 15 Jun. 2014, pages 3520 to 3522, respectively describe the coherent combination of laser pulses to overcome the limitations of laser amplifiers regarding pulse peak-power, pulse energy, and average power. For example, WO 2020/074581 A1 discloses an optical system having a dividing element, which divides an input laser beam into a number of spatially separate sub-beams, at least one optical amplifier, through which the spatially separate sub-beams propagate, at least one path-length adjustment element, which adjusts the path length of at least one of the sub-beams, and a combination element, which coherently combines the sub-beams in an output laser beam. The document addresses the problem of achieving high beam quality of the output laser beam, and reducing the requirement of the surface quality of the used optical components as compared to the prior art.

The coherent combination of laser pulses, as described e.g. in Opt. Express 20, 18097 (2012), typically involves a set of laser pulses separated in space and time, a method to combine said pulses in space, e.g. using polarization beam splitters, and a method to control the phase difference between pairs of beamlets. If the phases between beamlets are perfectly matched, i.e. if the phase difference is zero or very close to zero (or a multiply of $2\pi$), the beams are effectively combined into one single coherent laser pulse.

For efficient combination, the phase between beams must be actively controlled to compensate for variations in the optical path length. Known technologies are e.g. the Hänsch-Couillaud detection or the LOCSET technique. A signal, which characterizes the efficiency of the combination, e.g. the power of the coherently combined pulses, is derived from the beam-combining element, typically for each pair of beams. This signal is then used to actively control the phase between the beams, e.g. by controlling the optical path length difference between pulses using an array of piezo-mounted mirrors. Since after the combination, the output can be considered as a single laser pulse, the phase detection happens before the laser output and especially before an application driven by the (then considered single) laser pulse.

The coherent combination of laser pulses is a complex technique. Typically, it sets stringent requirements on the transverse mode of the beamlets and the accuracy of the phase control.

SUMMARY

It is an object of the present invention to overcome the described limits, in particular regarding pulse peak-power, pulse energy, and average power, e.g. provide at least gigawatt-level ultrafast laser pulses at kilowatt-level (and above) average power, while reducing the technical complexity.

The object is achieved by way of a method for providing an ensemble of pulsed beamlets described hereafter and a corresponding optical arrangement, respectively.

To overcome the pulse length (peak power) limit, in particular of rare-earth doped lasers (e.g. Yb-based systems), laser pulses can be spectrally broadened after amplification using non-linear effects to provide the bandwidth required to support few-fs pulses, and then be compressed again before delivery to an interaction point.

For fibre lasers, the broadening can be done in a gasfilled hollow-core fibre. The fibre guides the laser pulse over an extended interaction length, while the gas acts as a non-linear medium, which broadens the spectrum. However, the laser damage threshold of a typical fibre has limited this concept to pulses of a few millijoule.

The method therefore comprises providing a beamlet pattern. The beamlet pattern consists of a plurality of spatially distributed pulsed laser beamlets. In particular, providing the beamlet pattern can comprise splitting a single-aperture laser beam into the beamlets or alternatively directly generating the beamlet pattern. The beamlet pattern can be generated by a spatial arrangement of single laser beams, or from an arrangement of multiple fibers, or from a multicore fibre.

The beamlets are then spectrally broadened, in particular using non-linear effects, e.g. in a gas filled multi-pass cell. Experiments have shown that this technique can sufficiently broaden the spectrum of an initially one picosecond-level pulse to support few tens of femtosecond pulse lengths after compression. This technique therefore opens the path of linking the efficiency and average-power of laser systems such as Yb-based lasers with the short pulse lengths (peak powers) that have, so far, only been provided by Ti:Sapphire systems.

However, the pulse energy supported by a typical spectral broadening device scales only weakly with the size of the setup and renders this concept impractical for high pulse energies. In particular, the pulse energy supported by a multi-pass cell generally scales linearly with the distance between the curved mirrors forming the optical cavity; a 100 millijoule pulse would already require a multi-pass cell length of the order of ten meters. It is obvious that a multi-pass cell size would become impractical for pulse energies of several joules.

These scaling limitations can be overcome by the use of a pattern of transversely distributed independent beamlets instead of a single intense laser pulse. However, those beamlets would interfere with each other in the region of interaction with the nonlinear medium, leading to intensities causing a breakdown of the broadening effect.

Separating the beamlets in time, by delay of each single beam, the interaction of the single beams can be mitigated. By spreading the beamlets in time, an intensity enhancement in focus is avoided, which originates from the Fourier transformation of a (transverse) beamlet distribution. In other words, by using multiple beamlets, the size constraint of the multi-pass cell is overcome.

After spectral broadening, the beamlets are then incoherently combined in space and time to provide an ensemble of laser beamlets, having a defined envelope, the ensemble of beamlets effectively acting as a single ultrafast high-energy laser pulse.

Within the context of this disclosure, two waves are defined as being coherently combined when their phase difference $\varphi_2$-$\varphi_1$ is constant and small, i.e. close to zero or close to a multiple of $2\pi$. If the two combined waves have a random and/or changing phase relation, the waves are therefore incoherently combined. From different reported coherent beam combination experiments we conduct a margin of +/−10% and preferably +/−5% of constant phase relation to take phase and actuator errors into account.

Consequently, combined laser beamlets having a difference in frequency of more than 5% and in particular more than 10%, combined laser beamlets having a random and/or changing phase relation, and combined laser beamlets not actively held within said margin of phase difference are all defined as being incoherently combined.

In other words, if several (coherent or incoherent) beamlets are superimposed, the resulting ensemble of beamlets is considered as being incoherent, if the statistical phase difference $\Delta\varphi$ among the beamlets is larger than $\pi/20$ rad, preferably larger than $\pi/10$ rad.

Some applications, including all applications driven only by the intensity of the laser pulse, do not require a single coherent drive laser pulse. Rather, they require a certain and usually well-defined energy density, i.e. some specific energy contained within a certain volume, to drive the application. These applications include laser plasma acceleration (and its applications) as well as laser-driven material processing, e.g. cutting, welding, and ablation.

This is a significantly relaxed constraint. For example, a plasma wave can be driven by an incoherent combination of laser pulses. While the incoherently combined laser beamlets may interfere, resulting in a substructure of the pulse envelope in space and time, the response of the plasma has a characteristic time and length scale, e.g. the plasma wavelength. If the characteristic scale of the substructure (in space and time) is sufficiently small, the plasma response averages over these variations, and the incoherently combined pulse effectively act as a single pulse. In this context, "sufficiently small" should be understood as being smaller than the plasma wavelength. This insight enables applications, where the application is driven by a laser pulse being formed from an incoherent combination of beamlets.

The incoherent combination of a multitude of laser beamlets has the goal to confine the beamlets within an envelope, i.e. to confine a certain amount of energy within a certain volume at the application. In contrast to coherent combination, the phases between the pairs of beamlets are random and measuring the phase difference between beamlets may therefore be omitted.

Using an incoherent combination of beamlets that effectively acts as a single drive laser pulse can be advantageous for several applications.

For example, the performance of a laser-plasma accelerator is to a large extent determined by the intensity of the drive laser pulse. Variations in the pulse length, energy, beam profile and other properties influence the stability of the laser-plasma generated beam, e.g. the energy or charge of a laser-plasma accelerated electron beam. Shot-to-shot stabilities on a (below) sub-percent level might be required for drive laser parameters such as the pulse length, energy, and spot size, to provide a laser intensity stability suitable to support electron beams with sub-percent repeatability in energy.

In this regard, providing a series of incoherently combined beamlets within a defined envelope, which then effectively act as a drive laser pulse, is particularly beneficial, as variations in individual beamlets would average out and stability requirements of individual beamlets are relaxed. This applies, in particular, to variations of the spot size in focus and the pulse length of individual beamlets. Incoherently combined beamlets driving a laser-plasma accelerator are a solution for the drastic stability requirements demanded by the respective applications.

In some embodiments, the method can therefore comprise a step of fine-tuning spatio-temporal properties of the combined beamlet pattern (e.g. the transverse or temporal pulse envelope and/or the center wavelength of each beamlet) and/or of individual beamlets (e.g. the delay between beamlets, the pulse envelope, the spectral bandwidth, etc.). Such capabilities may, for example, be required to provide a specific temporal or spatial shape of the envelope of the beamlet ensemble.

In some embodiments, the method can further comprise the step of modifying (tuning) optical properties (e.g. beam divergence, spot size, etc.) of the beamlets prior to the step of spectral broadening. Matching the optical properties of the beamlets with the optical broadening device can enhance the overall efficiency of the system and/or the "quality" of the laser pulses (with respect to the requirements of the use-case).

Advantageously, the method can comprise, after spectral broadening and incoherent combination (in space and time), driving an application by the incoherently combined beamlets.

For example, the method can include a capability to tune the optical path length of individual beamlets, e.g. by using piezo mounted mirrors, based on the application. However, this capability is used to set the pulse length, or, more generally, the envelope (3D shape) formed by the incoherently combined beamlets. Here, contrary to the coherent combination of laser pulses, tuning the optical path length is not used to minimize the phase difference between beamlets. Instead, a key performance parameter (figure of merit) of the application is used to derive a signal, which actively controls the optical path length differences of the beamlets.

For example, with regard to laser-plasma electron accelerators, the electron beam energy depends on the drive laser intensity and thus the drive laser pulse length. Using the electron energy as a figure of merit (control input), a control algorithm can tune the optical path lengths of the beamlets such that the pulse length of the ensemble of beamlets at the application is optimized to result in the desired electron beam energy.

Similarly, once an optimum pulse length for the beamlet ensemble has been found, shot-to-short variations of the beamlet parameters still might result in variations of the ensemble properties and thus might results in variations of the application performance.

To improve the application performance, it can therefore be beneficial to derive a control signal from the application, e.g. the shot-to-shot stability of the resulting electron beam energy, based on which the beamlets are randomized within the ensemble, thereby averaging (eliminating) correlated variations on the beamlets.

It is important to note, that using the actual application as a figure of merit for combining the beamlets is fundamentally different to the typically employed technique of coherent combination, which is based on detecting the phase differences between beamlets. In fact, the method disclosed herein can be blind to the phase difference between beamlets, which is a key defining aspect of coherent combination.

Using the actual application of the laser as a figure of merit to control the combination of the beamlets can actively counteract any disturbances to the combined beamlet ensemble that might occur between the laser exit and the interaction at the application, for example by the laser transport.

In short, a method for accelerating charged particles comprising the steps of a) providing an ensemble of laser beamlets by the already described method, b) driving a plasma wave in a plasma target with the provided ensemble of laser beamlets, c) injecting particles, in particular electrons, into a wake field of the plasma wave, d) accelerating the injected particles by the wake field, and e) extracting the accelerated particles from the plasma.

In addition to the aforementioned method, an optical arrangement for providing an ensemble of pulsed laser beamlets having a defined envelope is proposed. For the sake of conciseness, functions and advantages of the respective components of the optical arrangement will only be discussed in detail, if they have not already been described in context of the disclosed method.

The optical arrangement comprises a beamlet generating device providing a beamlet pattern of spatially distributed laser beamlets.

The optical arrangement comprises a first optical device for spreading spatially distributed (pulsed) laser beamlets in time by introducing a different temporal delay to each of the beamlets. The first optical device can be a (first) step optic.

According another aspect, the optical arrangement comprises a spectral broadening device.

Preferably, the spectral broadening device can comprise at least one gas-filled multi-pass cell. The multi-pass cell can be a Herriott Cell. A Herriott Cell comprises curved mirrors forming a cavity. A laser pulse, injected into the cavity, bounces many times between the mirrors. At each pass, the laser is focused at the cavity's symmetry plane. Injected at an angel, the laser spots form a ring pattern at the mirror surfaces.

A Herriott Cell is often considered using a single laser beam. However, a Herriott Cell can also be used with a pattern of beamlets, i.e. spatially distributed laser beamlets. As defined in the original publication disclosing the so-called Herriot Cell, Appl. Opt. 3, 523 (1964), the reflection pattern on the mirrors, and thus the beam path of a ray in a Herriott Cell type optical system, is defined by the in-coupling angle and position of a ray with respect to the optical axis of the mirror configuration.

Furthermore, as described in the original publication, the Herriott Cell system can be described by a series of thin lenses in a relay imaging configuration. Assuming that the beamlets are coupled to the cavity in the object plain, the pattern will be conserved after one pass through the cavity (two thin lenses) and imaged to a new imaging plain. This plain is imaged again, respectively. This assumes a resonance condition of the Herriott type cavity, which is also defined in Appl. Opt. 3, 523 (1964). To summarize: The properties of a Herriott Cell are typically described using a ray that is coupled into the cell at a certain position and angle. However, this ray represents the case of both, a single laser beam, but also a transverse distribution of beams (or beamlets).

Depending on the specific parameters of the setup, a large number (typically several tens) of reflections are possible. Thereby, a Herriott Cell effectively folds up a long optical path using a very compact setup.

At the focus, the laser intensity can be high enough to support non-linear effects. Adding a non-linear medium at the focus (symmetry) plane, e.g. the center plane of the cavity, the laser pulse interacts with the medium over many passes. For example, filling the multi-pass cell with a noble gas, the laser effectively accumulates spectral broadening over many passes. Alternatively, a non-linear crystal at the focal plane of the cavity can be used for spectral broadening. Experiments have shown that this technique can sufficiently broaden the spectrum of an initially picosecond-level pulse to support few-tens of femtosecond pulse lengths after compression. This technique therefore opens the path of linking the efficiency and average-power of laser systems such as Yb-based lasers with the short pulse lengths (peak powers) that have, so far, only been provided by Ti:Sapphire systems.

The spectral broadening device can be configured for amplitude filtering the beamlets by non-linear effects in a medium inside the spectral broadening device, in order to improve the spatio-temporal properties (e.g. beam quality) of the beamlets.

Further, the optical arrangement comprises a combining device for incoherently combining the beamlets in space and time to provide an ensemble of beamlets effectively acting as a single laser pulse.

According to an advantageous aspect, the optical arrangement can comprise an application that is driven by the combined ensemble of beamlets. From a key performance parameter of this application, a control signal may be derived, which control signal is used to determine the spatio-temporal shape of the ensemble of beamlets.

In at least some embodiments, the combining device comprises a second optical device for temporally combining the beamlets. In other words, the second optical device can be configured to (at least partially) cancel out the temporal delays introduced by the first optical device. The second optical device can be a (second) step optic.

Additionally, the combining device can comprise at least one diffractive, refractive and/or reflective optical element for spatially combining the beamlets into an ensemble of beamlets effectively acting as a single laser pulse. Said optical element can comprise a lens array or a phase plate.

The beamlet generating device can comprise a spatial beam splitter for splitting a (pulsed) single-aperture laser beam into the beamlet pattern. The single-aperture laser beam can, for example, be provided by a thin-disk, slab or fibre laser. These laser sources are compact and efficiently deliver high-energy laser pulses. Then, spatially distributing the single laser pulses into a pattern of beamlets is comparatively simple and efficient. The spatial beam splitter can comprise a diffractive, refractive or reflective optical device. In particular, said optical device can comprise a lens array, a mask, a grating or a phase plate.

According to an advantageous aspect, the optical arrangement can further comprise an imaging system having one or more refractive and/or reflective optical elements configured for modifying optical properties of the beamlets when matching the beamlet pattern into the spectral broadening device to enable the beamlets to properly pass the broadening device.

According to another advantageous aspect, the optical arrangement can further comprise adaptive optics for aberration and wave-front control of the beamlet pattern and/or of individual beamlets.

According to still another advantageous aspect, the first and/or second optical device for introducing or removing a temporal delay between beamlets can comprise a reflective step optic or a transmittive step optic. A thin-film polarizer and a quarter-wave plate can be associated with the reflective step optic for modifying the temporal delay under normal or close-to-normal incidence.

According to yet still another advantageous aspect, the optical arrangement can further comprise actuated mirror elements for fine-tuning and/or stabilization of spatio-temporal properties of the beamlets, e.g. a defined temporal delay between beamlets and/or a pulse envelope.

Consecutive laser pulses have a certain stability in pulse length with respect to each other. Variations in pulse length result from variations in the laser pulse generation and are typically around one percent. If a laser pulse is generated by superposition of many (but shorter) single pulses, the stability of the total pulse is determined particularly by the stability of the time delay between the single pulses. Therefore, the stability of the pulse length is no longer determined by the physical effects during amplification and can be vastly improved. Some applications, e.g. laser-plasma acceleration, require a very stable pulse length.

Further details and advantages are described in the following with reference to the drawings, which show in FIG. 1: a schematic representation of an optical arrangement for providing an ultrafast high-energy laser pulse, in FIG. 2: a schematic representation of a laser-plasma accelerator, and in FIG. 3: a schematic representation of an incoherent beamlet combination.

DETAILED DESCRIPTION

The optical arrangement 100 depicted in FIG. 1 comprises a beamlet generating device 2 providing a beamlet pattern 4 of spatially distributed laser beamlets 5. A vast variety of beamlet patterns can be provided. Optionally, the beamlet generating device 2 comprises a spatial beam splitter 6 for splitting a pulsed single-aperture laser beam 3 into the beamlet pattern 4. The single-aperture laser beam 3 can be provided by a laser 1. The laser 1 can be a thin-disk, slab or fiber laser. In this particular example, the spatial beam splitter 6 comprises an optical device, which device can be a diffractive, refractive or reflective optical device. For example, the optical device can comprise a lens array, a mask, a grating or a phase plate. Alternatively, the beamlet pattern 4 can directly be generated by an arrangement of fibre lasers, in particular in/by a multicore fibre of a multi-core fibre laser 7.

The optical arrangement 100 further comprises an optical arrangement for spreading the spatially distributed laser beamlets 5 in time. The optical arrangement comprises a first optical device 8 for spreading spatially distributed pulsed laser beamlets 5 in time by introducing a different temporal delay d to each of the beamlets 5. In this particular example, the first optical device 8 is a reflective step optic. Optionally, the optical arrangement comprises a thin-film polarizer 9 and a quarter-wave plate 10 associated with the reflective step optic for introducing the temporal delay d under normal incidence or close to normal incidence. Alternatively, the optical device 8 can be a transmittive step optic.

Still further, the optical arrangement comprises a spectral broadening device 11. The spectrally broadening device 11 spectrally broadens the beamlets 5. In this particular example, the spectral broadening device 11 comprises at least one multi-pass cell 12, particularly a Herriott Cell. The Herriott Cell 12 is made up of a plurality of opposing (curved) mirrors 13. In this particular example, a hole is machined into one of the mirrors 13 to allow the input laser beamlets 5 to enter the cavity. The beamlets 5 pass a medium 14 multiple times, while being reflected back and forth between the mirrors 13. In this particular example, the beamlets 5 may exit through the same hole or another hole in one of the mirrors 13. Mere optionally, the spectral broadening device 11 is configured for amplitude filtering the beamlets 5 by non-linear effects in the medium 14 inside the spectral broadening device 11.

In this particular example, the optical arrangement 100 further comprises an optional imaging system 15 having one or more refractive and/or reflective optical elements 16 configured for modifying optical properties of the beamlets 5 (e.g. beam divergence, spot size, etc.) when imaging the beamlet pattern 4 into the spectral broadening device 11.

Mere optionally, the optical arrangement 100 comprises adaptive optics 17 for aberration and wavefront control of the beamlet pattern 4 and/or individual beamlets 5.

In this particular example, the optical arrangement 100 additionally comprises actuated mirror elements 21 for fine-tuning spatio-temporal properties of the beamlet pattern 4 (e.g. a temporal delay between beamlets) or of individual beamlets 5 (e.g. for controlling the pulse envelope). The actuated mirror elements 21 are positioned in the beam path depending on the properties to be fine-tuned.

The optical arrangement 100 also comprises a combining device 18 for incoherently combining the beamlets 5 in space and time to provide the ensemble of beamlets having a defined envelope; the ensemble of beamlets effectively acting as a single laser pulse 3.

In this particular example, the combining device 18 comprises a second optical device 19 for temporally combining the beamlets 5 (compressing the envelope of the ensemble of superimposed beamlets). The second optical device 19 is a second step optic. The second step optic can be a transmittive or reflective step optic. The combining device can further comprise a thin-film polarizer and a quarter-wave plate associated with the reflective step optic. The second optical device 19 can be actuated to controlling characteristics of the beamlets.

Optionally or alternatively, the combining device 18 also comprises at least one diffractive, refractive and/or reflective optical element 20 for spatially combining the beamlets 5 into an ensemble of laser beamlets having a defined envelope, the ensemble of beamlets effectively acting as a laser beam 3. For example, the optical element 20 can comprise a lens array or a phase plate.

It should be noted, though, that the actuated mirror elements 21 may optionally be integrated into or part of any of the first optical device 8, second optical device 19 and/or combining device 18.

As depicted, the optical arrangement 100 can also comprise an application 22 being driven by the combined ensemble of beamlets. From a key performance parameter of this application, a control signal 23 is derived. The control signal 23 is used to determine the spatio-temporal shape of the ensemble of beamlets, in particular by controlling the actuated mirror elements 21 and/or other actuated optical elements for altering e.g. the path length of the beamlets.

Figure 2:
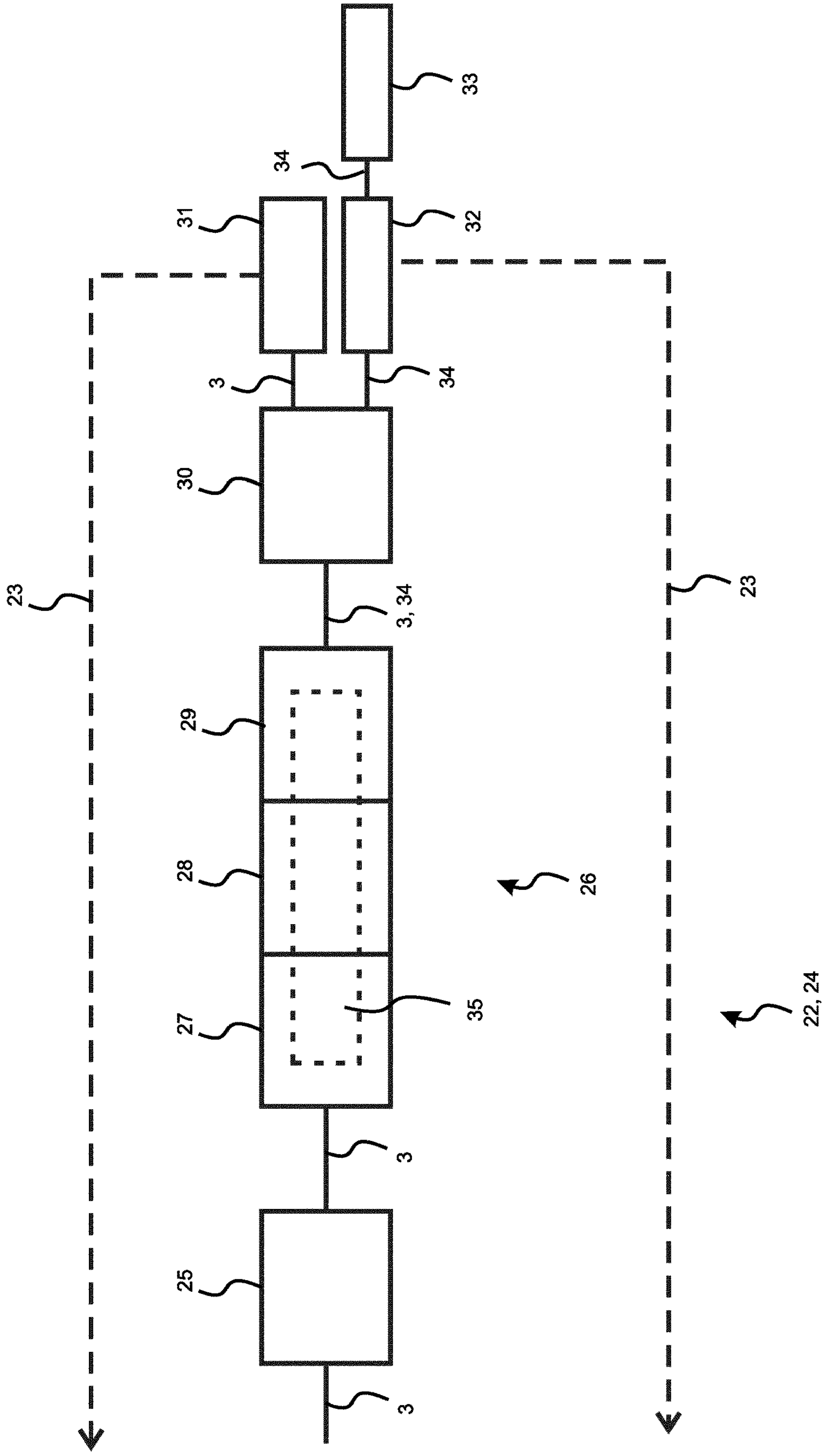

FIG. 2 depicts a simplified schematic laser-plasma accelerator 24 as an example application 22 being part of and driven by high-energy laser pulses provided by the already described optical arrangement 100.

The laser-plasma accelerator 24 comprises an optical laser beam transport 25. The (laser) beam transport 25 comprises optical elements to deliver the laser pulse 3 to the application 22 where it interacts with another element, here: with the plasma target 26 of the laser-plasma accelerator 24. The beam transport 25 includes at least a focusing element to focus the laser beam 3 to the desired spot size and/or intensity, to drive the application 22. The beam transport 25 also includes elements to diagnose the laser 3, in particular its alignment (position and direction) with respect to the interaction point, as well as other properties, such as the wavefront or beam profile. The laser transport 25 can include elements to correct the alignment of the laser beam with respect to the interaction point, or other properties of the laser beam 3, such as the wavefront.

The laser-plasma accelerator 24 further comprises of a plasma target 26. The plasma target 26 is typically located in a vacuum. The plasma can be provided by a gas jet or a gas-filled volume of at least one gas species. Typical gas species are hydrogen or helium. The gas is ignited, for example by a discharge, another laser pulse, or the pre-pulse of the drive laser 3, to form a plasma 35. Within the plasma target 26, the drive laser pulse 3 drives a plasma wave. First, particles (e.g. electrons) are injected into the plasma wave by an injector 27, and second, accelerated in an accelerator 28 by the plasma wave. Finally, both laser 3 and accelerated particle beam 34 (e.g. an electron beam) are extracted from the plasma 35. The plasma target 26 typically provides a very specific plasma density profile, where regions of different plasma density can be tailored to the specific task, e.g injection, acceleration, extraction.

After extraction in an extractor 29, the laser pulse 3 and the particle beam 34 are separated in a separator 30, e.g. by a mirror featuring a hole on axis to allow the particle beam 34 to pass, or a magnet that deflects the particle beam 34.

After the plasma target, properties of the laser 3 and the particle beam 34 are diagnosed by at least one sensor for laser diagnostics 31 and/or particle diagnostics 32, for example, the remaining laser pulse energy, or the energy of the generated particle beam. The particle beam 34 can then be delivered to an (particle) application 33, e.g. an electron application.

The result of said laser diagnostics 31, particle beam diagnostics 32, or application 33, e.g. properties of the generated particle beam 34 (its energy, charge, or shot-to-shot stability) or properties of the laser beam 3, which are typically reduced in pulse energy where the reduction serves as a measure for how efficiently the application process is driven, can be used to generate a control signal 23 that directly or indirectly controls the incoherent combination of the beamlets.

Some exemplary applications especially suitable for using laser driven particle acceleration include, with "high charge" referring to a range from few pC to several nC.

- sterilization of samples with electron beams (energies: MeV scale; charge: High)
- cross-linking of materials by means of electron beams (energies: scale MeV; charge: High)
- generation of X-rays using bremsstrahlung (energies: scale MeV; charge: High)
- all applications using bremsstrahlung, esp. sterilization by gammas
- generation of radioisotopes by photonuclear reaction. Examples are all nuclides which are also used medically, e.g., Mo99, Cu64, F18, C11, N13, O15 and others (electron energies in the range of a few MeV up to few hundreds of MeV are of particular interest, charge: as high as possible, average electron beam powers of kW are desirable)
- radiotherapy applications: FLASH Therapy and VHEE (energies in the range of a few 10 MeV up to a few 100 MeV, charge: high)
- electrons as the basis of a Compton backscattering source (electron energies in the range of a few 10 MeV to a few 100 MeV, charge as high as possible, from a few pC up to nC)
- a free-electron laser driven by a laser-plasma accelerated electron beam (MeV to GeV scale electron beam energies and high charge)

Figure 3:
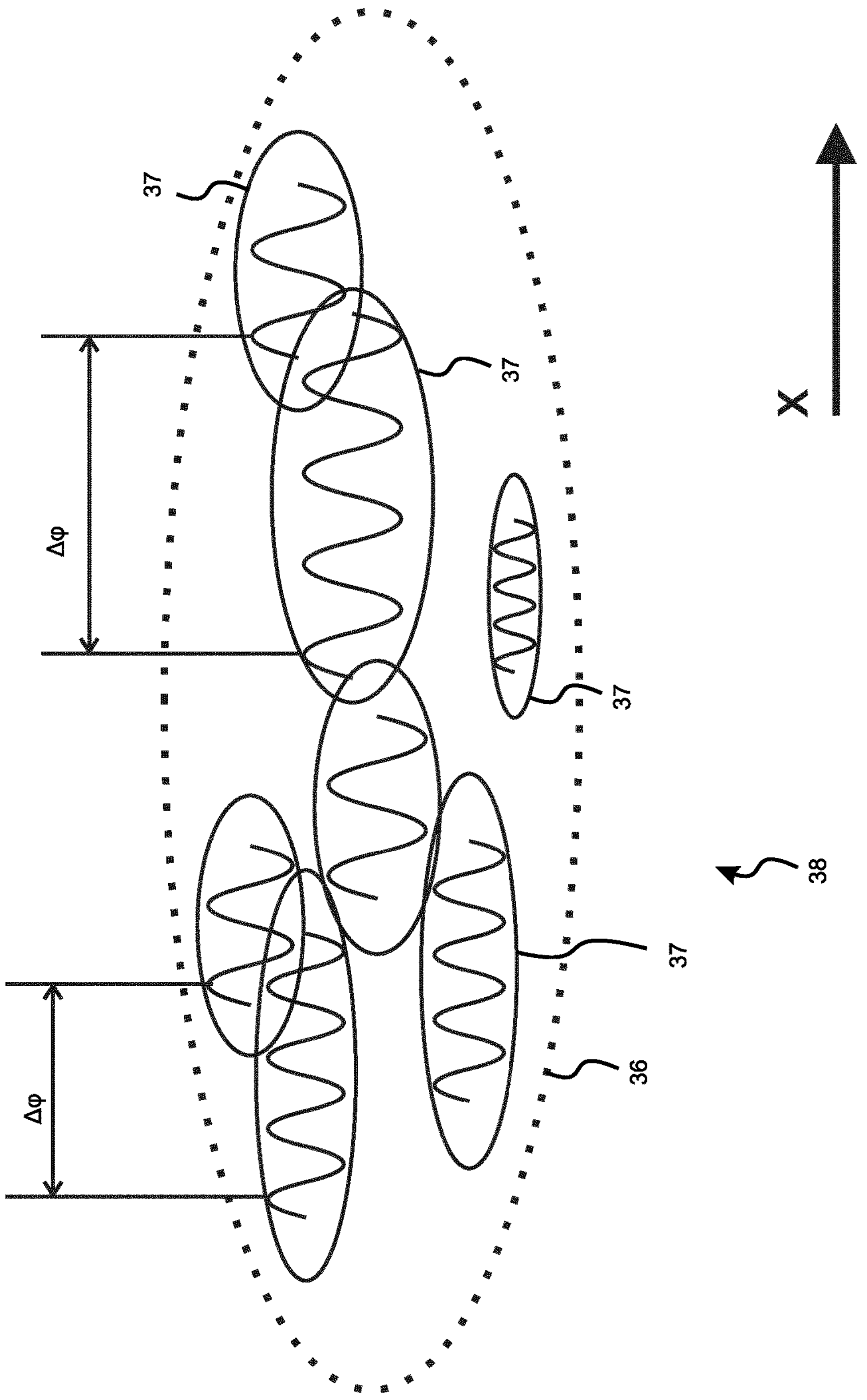

In FIG. 3, a graphical representation for describing the incoherent combination of laser beamlets 37 into a beamlet ensemble 38 is shown.

Here, a number of individual beamlets 37 form an ensemble 38, which can be described by a pulse envelope 36, forming a distinct 3D pulse shape. The pulse shape (envelope 36) is determined by the delay and transverse offset between individual beamlets 37. The beamlets 37 typically are of similar size or smaller, compared to the desired pulse envelope. 36. It is important to note, however, that for an incoherent combination of beamlets 37, the phase difference $\Delta\varphi i$ between the i beamlets 37 can be and usually is random, since the method disclosed does not necessarily provide measuring the phase difference between individual beamlets 37.

Instead, the method may use the performance of the application 22, which is driven by the incoherently combined beamlets 37, as a figure of merit to control and optimize the shape of the pulse envelope 36.

For example, for applications 22 that depend on the intensity of the drive laser pulse 3, such as a laser-plasma accelerator 24, the resulting energy of the generated particle beam 34 can be used to control the shape of the envelope 36 and the distribution of beamlet 37 within the envelope 36.

REFERENCE SIGNS

100 optical arrangement
1 laser
2 beamlet generating device
3 single-aperture laser beam
4 beamlet pattern
5 laser beamlets
6 spatial beam splitter
7 multicore fibre or multicore fibre laser
8 first optical device (e.g. a step optic)
9 thin-film polarizer
10 quarter-wave plate
11 spectral broadening device
12 multi-pass cell
13 mirror
14 medium
15 imaging system
16 optical element for modifying optical properties of the beamlets
17 adaptive optics
18 combining device
19 second optical device (e.g. a step optic)
20 optical element for spatially recombining the beamlets
21 actuated mirror element
22 application
23 control signal
24 laser-plasma accelerator
25 laser transport incl. diagnostic and focusing
26 plasma target
27 injector
28 accelerator
29 extractor
30 separator
31 laser diagnostics
32 particle diagnostics
33 particle application
34 particle beam
35 plasma
36 pulse envelope
37 beamlet
38 beamlet ensemble

The invention claimed is:

1. A method for providing an ensemble of pulsed laser beamlets having a defined envelope, comprising the steps of:
(a) providing a beamlet pattern comprising a plurality of spatially distributed laser beamlets,
(b) separating the beamlets in time by introducing different temporal delays to each of the beamlets,
(c) spectrally broadening the beamlets, and
(d) incoherently combining the beamlets in space and time to provide the ensemble of beamlets, wherein the step of incoherently combining the beamlets is directly or indirectly controlled, and wherein a figure of merit of an application being driven by the ensemble of beamlets is used as a control input for controlling the step of incoherently combining the beamlets.

2. The method according to claim 1, wherein the steps are executed in order from (a) to (d).

3. The method according to claim 1, wherein the step of providing the beamlet pattern comprises splitting a single-aperture laser beam into the beamlets.

4. The method according to claim 1, wherein providing the beamlet pattern comprises generating the beamlet pattern
(i) by a spatial arrangement of single laser beams, or
(ii) from an arrangement of multiple fibers, or
(iii) from a multicore fiber.

5. The method according to claim 1, further comprising the step of fine-tuning spatio-temporal properties of at least one of the beamlet pattern and individual beamlets.

6. The method according to claim 1, further comprising the step of modifying optical properties of the beamlets prior to the step of spectrally broadening.

7. The method according to claim 1, wherein the step of directly or indirectly controlling comprises controlling a length of an optical path attributed to a respective beamlet.

8. A method for accelerating charged particles, comprising the steps of
(a) providing an ensemble of laser beamlets by the method according to claim 1,
(b) driving a plasma wave in a plasma target with the provided ensemble of laser beamlets,
(c) injecting particles into a wake field of the plasma wave to provide injected particles,
(d) accelerating the injected particles by the wake field to provide accelerated particles, and
(e) extracting the accelerated particles from the plasma.

9. An optical arrangement, comprising:
a beamlet generating device providing a beamlet pattern of spatially distributed laser beamlets,
a first optical device for spreading spatially distributed laser beamlets in time by introducing a different temporal delay to each of the beamlets,
a spectral broadening device, and
a combining device for incoherently combining the beamlets in space and time to provide an ensemble of beamlets having a defined envelope, wherein the combining device is configured to be directly or indirectly controlled by a control input based on a figure of merit of an application being driven by the ensemble of beamlets.

10. The optical arrangement according to claim 9, wherein the spectral broadening device comprises at least one multi-pass cell.

11. The optical arrangement according to claim 10, wherein the at least one multi-pass cell is a Herriott Cell.

12. The optical arrangement according to claim 9, wherein the spectral broadening device is configured for amplitude filtering the beamlets by non-linear effects in a medium inside the spectral broadening device.

13. The optical arrangement according to claim 9, wherein the combining device comprises a second optical device for temporally combining the beamlets.

14. The optical arrangement according to claim 13, wherein at least one of the first optical device and the second optical device is a step optic.

15. The optical arrangement according to claim 9, wherein the combining device comprises at least one of at least one diffractive, refractive and reflective optical element for spatially combining the beamlets.

16. The optical arrangement according to claim 15, wherein the optical element comprises a lens array or a phase plate.

17. The optical arrangement according to claim 9, wherein the beamlet generating device comprises a spatial beam splitter for splitting a single-aperture laser beam into the beamlet pattern.

18. The optical arrangement according to claim 17, wherein the single-aperture laser beam is provided by a thin-disk, slab or fiber laser.

19. The optical arrangement according to claim 17, wherein the spatial beam splitter comprises a diffractive, refractive or reflective optical device.

20. The optical arrangement according to claim 17, wherein the optical device comprises a lens array, a mask, a grating or a phase plate.

21. The optical arrangement according to claim 9, further comprising an imaging system having one or more of at least one of refractive and reflective optical elements configured for modifying optical properties of the beamlets when imaging the beamlet pattern into the spectral broadening device.

22. The optical arrangement according to claim 9, further comprising adaptive optics for aberration and wavefront control of at least one of the beamlet pattern and individual beamlets.

23. The optical arrangement according to claim 9, wherein at least one of the first optical device and a second optical device for introducing or removing a temporal delay between beamlets comprises a reflective step optic, or a transmittive step optic.

24. The optical arrangement according to claim 23, wherein at least one of the first optical device and the second optical device comprises the reflective step optic, wherein a thin-film polarizer and a quarter-wave plate are associated with the reflective step optic for modifying the temporal delay under normal or close-to-normal incidence.

25. The optical arrangement according to claim 9, further comprising actuated mirror elements for fine-tuning spatio-temporal properties of the beamlets.

26. The optical arrangement according to claim 25, wherein the spatio-temporal properties to be tuned comprise a temporal delay between the beamlets.

27. A laser-plasma accelerator comprising:

the optical arrangement according to claim 9 for providing an ensemble of beamlets effectively acting as a laser pulse driving the laser-plasma accelerator, a plasma target including an injector for injecting particles into a plasma wave driven by the ensemble of beamlets, an accelerator for accelerating the injected particles in a wake field of the plasma wave, an extractor for extracting the accelerated particles from the plasma wave, and at least one of at least one laser sensor and at least one electron diagnostic sensor for outputting a control signal controlling the incoherently combining of the beamlets in the optical arrangement.

* * * * *